United States Patent
Haass

[11] 3,942,098
[45] Mar. 2, 1976

[54] APPARATUS FOR GENERATING UNGROUNDED VOLTAGES

[75] Inventor: Adolf Haass, Munich, Germany

[73] Assignee: Siemens Aktiengesellschaft, Berlin & Munich, Germany

[22] Filed: May 6, 1974

[21] Appl. No.: 467,574

Related U.S. Application Data

[63] Continuation of Ser. No. 288,286, Sept. 12, 1973, abandoned.

[30] Foreign Application Priority Data

Sept. 27, 1971 Germany............................ 2148153

[52] U.S. Cl. .................. 323/23; 178/68; 323/75 N
[51] Int. Cl.² ........................................ G05F 1/46
[58] Field of Search ............. 323/16, 19, 23, 75 N; 178/68, 69

[56] References Cited
UNITED STATES PATENTS 2,772,387 11/1956 Liguori ............................ 323/23 X
3,623,140 11/1971 Nercessian ........................ 323/23

*Primary Examiner*—A. D. Pellinen

[57] ABSTRACT

A circuit arrangement for facilitating the determination of a wire break in a line interconnecting a plurality of subscriber stations in a direct current, keyed data transmission system. Each subscriber station is equipped with a bridge circuit containing a balancing resistance, bridge resistances and a fourth arm formed by the transmission line. A transmitter is connected in one diagonal of the bridge, and the receiver in another. An operational amplifier forms a first voltage source connected in the line circuit and a second voltage source connected in the balancing arm generates a monitoring current flow. The two operational amplifiers forming these voltage sources function as differential amplifiers, and the voltages are adjusted to the same value by a single balancing operation.

1 Claim, 2 Drawing Figures

APPARATUS FOR GENERATING UNGROUNDED VOLTAGES

This is a Continuation of application Ser. No. 288,286, filed Sept. 12, 1973 and now abandoned.

BACKGROUND OF THE INVENTION

This invention relates to apparatus for generating ungrounded voltages for superposition on a signal-bearing transmission line. In a commonly assigned, copending U.S. application, Ser. No. 275,411, filed July 26, 1972, now U.S. Pat. No. 3,803,355, there is described a circuit arrangement for line monitoring for wire breaks in direct current, keyed data transmission systems. The transmitting and receiving units of a subscriber station are provided with a low impedance internal resistance for the transmitter and a high impedance internal resistance for the receiver. Each internal impedance is connected into the shunt arm of a bridge circuit, having bridge arms composed in each case of the balancing network circuit, two complementary bridge resistances and the line. In each terminal station a first voltage source connected into the line circuit and a second voltage source connected into the balancing network circuit are provided. These voltage sources generate a monitoring current flow on the subscriber line in the presence of inversely-poled sending voltages across the terminal stations.

The arrangement set forth in the aforementioned application permits line monitoring through measurement of the conduction current. Thus, not only can a line break be detected, but also a breakdown in the power supply. The switching in of the two supplementary direct voltages has as a consequence that the transmission line always carries current in the operating state. When a breakdown occurs in the power supply, the station impedance becomes so high that a line break is simulated.

In providing the two supplementary voltage sources, one has to start from the assumption that the construction of prior art DC data transmission systems have low transmitting voltages and do not admit grounding of the two voltages. Therefore, to generate a voltage which is free of earth potential, a principle is employed which is applied in the known telegraph keying circuits. This principle contemplates an AC voltage being inductively balanced-out by a continually operating blocking oscillator; this AC voltage is rectified and supplied to the circuit as a DC voltage, which is independent of earth potential.

An object of this invention is the provision of a simple circuit arrangement for producing the aforementioned two supplementary voltages.

SUMMARY OF THE INVENTION

In order to achieve the aforementioned and other objects the sending unit is connected to a non-inverting input of a first operational amplifier. This amplifier has an output connected on the one side, to a transmission line, and on the other, a non-inverting input of a second operational amplifier is switched into the balancing-network circuit on the balancing-network resistance. Two resistances having the same value are arranged in series with a constant-current source between the output of the second operational amplifier and the reference point of the bridge circuit. An inverting input of the second operational amplifier is connected to a tap after the first resistance, and an inverting input of the first operational amplifier is connected to a tap after the second resistance. The two supplementary voltages are generated by means of two operational amplifiers.

In so doing, a DC voltage is supplied to the output and inverting input of the operational amplifiers functioning as differential amplifiers. This DC voltage is generated as a voltage drop across two resistances by means of a constant-current source. By regulating the constant current, both voltages are simply adjusted to the same value through a single balancing. The voltages are independent of earth potential.

The circuit of this invention can be constructed using integrated circuit techniques and requires little space. Blocking oscillator circuits and an inductive balancing-out are not required. Since the operational amplifiers have a very low output impedance, the supplementary voltage sources possess a very small internal impedance.

BRIEF DESCRIPTION OF THE DRAWINGS

Many other advantages, features and additional objects of the present invention will become manifest to those skilled in the art upon making reference to the detailed description and to the accompanying sheets of drawings in which a preferred embodiment incorporating the principles of the present invention is shown by way of illustrative example.

DETAILED DESCRIPTION OF THE DRAWINGS

Figure 1:
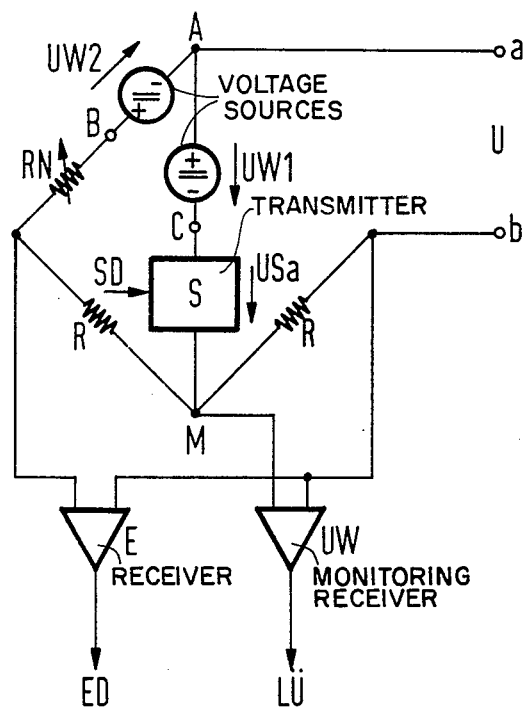
FIG. 1 is a schematic diagram of the construction of one of the two terminal stations constructed in accordance with the above referenced U.S. application.

FIG. 1 shows one of two terminal stations which are interconnected via the transmission line U. In the terminal station, a balancing network resistance represented simply as an adjustable resistance RN and the two resistances R form a bridge circuit together with the loop circuit of the transmission line U. A transmitter S is inserted into one shunt arm, and a receiver E into the other arm. The transmitter S may, for example, be an electronic telegraph signal transformer, which is keyed by data to be transmitted SD. A receiver E is shown herein as an amplifier, which for example transmits the received data ED to a subscriber's station (not shown herein), likewise via a telegraph signal transformer. In this type of arrangement, the internal impedance of the sender, independent of the input impedance of the receiver, is of extremely low resistance relative to the bridge resistances, so that a low transmitting voltage can be employed.

A commonly used technique is a transmission process utilizing two similarly constructed terminal stations known as a DC data transmission system. One voltage source UW1 is series-connected in a shunt arm with the sender, while the other voltage source UW2 is series-connected in a bridge arm with the balancing-network resistance RN. In order to balance the bridge circuit accurately, it is necessary that the two voltages UW1 and UW2 have the same value. A monitoring receiver UW measures the voltage across the resistance R. In trouble-free state, the voltage across the resistance R is always greater than 0. In the presence of a line break, no voltage drop arises across the resistance R, so that the monitoring receiver UW is actuated, and it transmits a monitoring signal LU.

Figure 2:
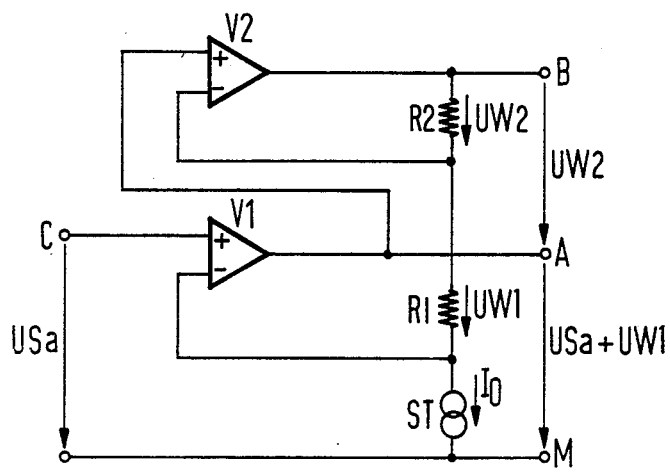
FIG. 2 is a schematic diagram of a preferred embodiment of the invention.

In accordance with the invention means are provided for producing ungrounded voltages. In the context of the above described terminal station preferred embodiments of the ungrounded voltage source may be used for the sources UW1 and UW2. Preferred embodiments of voltage sources constructed according to the invention are shown in FIG. 2. In applying the FIG. 2 circuit arrangement to the FIG. 1 terminal station it is inserted into the terminals A, B, C and M shown in FIG. 1, instead of the two voltage sources UW1 and UW2.

A basic concept in the generation of ungrounded voltages is the use of an operational amplifier, which functions as a differential amplifier, and to which a constant DC voltage is supplied between the output and the negating input. Since an operational amplifier amplifies the differential voltage applied between the two input terminals, the constant direct voltage is superposed on the applied sending signal.

Terminal C produces the output of the sender S (FIG. 1) transmitting the sending voltage USa toward the reference point M of the bridge; the sending voltage is applied across the non-inverting input of the operation amplifier V1. The output of the operational amplifier is connected to the non-inverted input of a second operational amplifier V2.

The direct voltages are generated by means of two resistances R1 and R2 having the same value and traversed by a constant current $I_0$ from a constant-current source ST. The voltage dropping across the resistance R2 represents the voltage UW2, which is applied across the negating input of the operational amplifier V2. The voltage UW1 appears across the resistance R1 and is applied across the negating input of the operational amplifier V1. At the output of the operational amplifier V1 there appears across terminal A and reference point or terminal M a voltage consisting of the sum of the sending voltage USa and the voltage UW1.

The voltage applied across the input terminals of the operational amplifier V2 consists of the sending voltage USa augmented by the voltage value UW1. To this is added the voltage UW2 which is applied between the output and the negating input, so that a voltage appears across output B of the operational amplifier V2 and reference point M, which consists of the sending voltage and the two voltages UW1 and UW2. Again, only the voltage UW2 is generated between the terminals B and A. There is no voltage difference between the terminal A and the common junction point of the resistances R1 and R2.

In the presence of a transmission line voltage breakdown, the bridge diagonal, referring to the FIG. 1 circuit, between the points A and M and the bridge arm between the terminals A and B are high impedance. As discussed above, this indicates a line break or the like. The constant-current source St is generated by a transistor circuit of known construction. By varying the constant current $I_0$, the two voltages UW1 and UW2 can be balanced in a simple manner.

The voltage source UW1 may be disposed in the line circuit, for example, in the line a (FIG. 1). To maintain the balancing condition of the bridge circuit, it is necessary that the voltage source UW1 have half the voltage value of the source UW2. The generation of the voltage sources by operational amplifiers V1 and V2 requires constant currents for the operational amplifiers. In that case, the resistance R1 and R2 traversed by the constant current is disposed between the outputs and the negating inputs of the operational amplifiers V1 and V2. The voltage sources UW1 and UW2 are balanced by adjusting the constant currents through resistors R1 and R2 by adjusting $I_0$.

This invention has been described hereinabove in terms of a preferred embodiment and in connection with an application of the invention to a particular circuit arrangement. The description is only exemplary, and it is to be noted that modifications to or changes in the described embodiment may be made within the scope of the invention, as defined by the appended claims. Further, the principles of the invention can be applied in environments other than that described herein.

I claim:

1. Apparatus for determining the existence of a wire break in a transmission line connecting subscriber stations in a direct current, keyed data transmission system comprising:

bridge circuit means in each said subscriber station, said bridge circuit comprising four arms constituted by said transmission line, balancing resistance means and first and second bridge resistances, transmitter means connected into one diagonal of said bridge circuit means, said transmitter means having at least first and second terminals, receiver means connected into another diagonal of said bridge circuit, first and second operational amplifier means, each having an inverting input and a non-inverting input and an output, a first terminal of said transmitter means being connected to said noninverting input of said first operataonal amplifier means, said output of said first operational amplifier means being connected to said transmission line and to said non-inverting input of said second operational amplifier means, a constant current source, first and second resistances, said output of said second operational amplifier means being connected to an end of said balancing resistance means, said end being connected to said output terminal of said second operational amplifier means and then to said transmission line, said output of said operational amplifier means being further connected to a series connection of said first resistance, a first junction point, said second resistance, a second junction point and said constant current source, said series combination being series connected to said second terminal of said transmitter means, said first junction point being connected to said inverting input of said second operational amplifier means and said second junction point being connected to said inverting input of said first operational amplifier means, said first bridge resistance being connected to said second terminal of said transmitter means and to said transmission line, and monitoring means connected across said first bridge resistance and for emitting a signal when there is no voltage drop thereacross, said second terminal of said transmitting means being further connected to the connecting point between said first and second bridge resistances.

\* \* \* \* \*